(12) United States Patent
Chen et al.

(10) Patent No.: US 7,552,126 B2
(45) Date of Patent: Jun. 23, 2009

(54) ACCESS RECORD GATEWAY

(75) Inventors: Lee Chen, Saratoga, CA (US); John Chiong, San Jose, CA (US); Phillip Kwan, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 427 days.

(21) Appl. No.: 11/446,028

(22) Filed: Jun. 2, 2006

(65) Prior Publication Data

US 2007/0282855 A1 Dec. 6, 2007

(51) Int. Cl.
*G06F 17/30* (2006.01)
(52) U.S. Cl. .................................. 707/10; 707/200
(58) Field of Classification Search .................. 707/100, 707/9, 10, 200
See application file for complete search history.

(56) References Cited

U.S. PATENT DOCUMENTS

| 7,360,237 B2 * | 4/2008 | Engle et al. ............... 726/1 |
| 2004/0254919 A1 * | 12/2004 | Giuseppini ............... 707/3 |
| 2005/0114186 A1 * | 5/2005 | Heinrich ............... 705/7 |

* cited by examiner

*Primary Examiner*—Cheryl Lewis
(74) *Attorney, Agent, or Firm*—Timothy X. Gibson, Esq.; Gibson & Dernier LLP

(57) ABSTRACT

Systems and methods of managing access records of user access to a secure data network include an access record gateway and an access record datastore; the access record gateway being in communication with an access server of the secure data network; and the access record datastore being in communication with the access record gateway. The access record gateway acquires user access information, such as time information; records the user access information in at least one access record; and stores the at least one access record in the access record datastore. The access record gateway also acquires user access activity information, such as user access termination information, and updates previously recorded user access information with the user access activity information. The at least one access record includes a plurality of sub-records, selected from a list including a user information sub-record, a network information sub-record, and a time information sub-record. The system may include a security application in communication with the access record gateway to query for an access record satisfying the security query parameter(s).

56 Claims, 12 Drawing Sheets

140

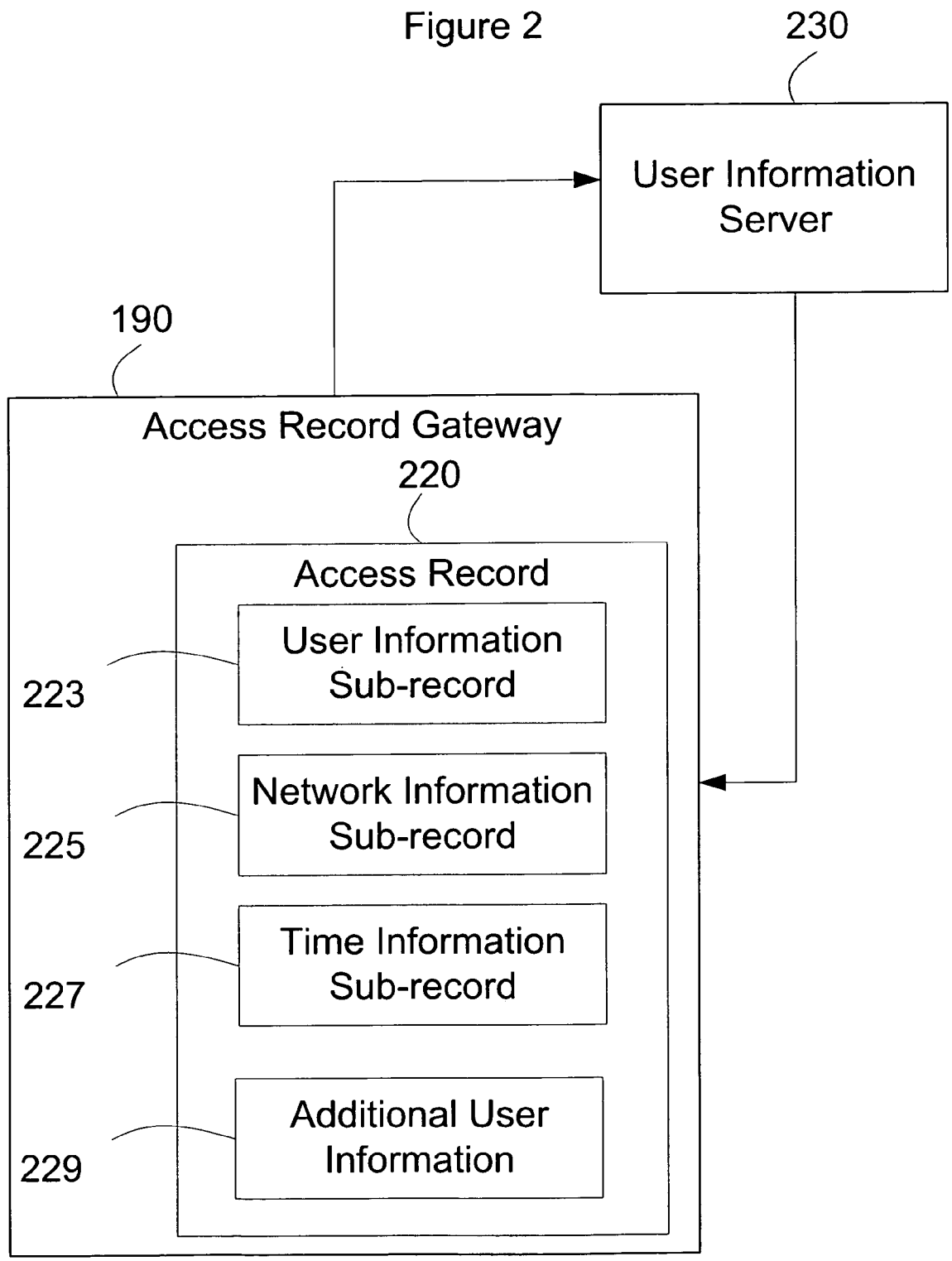

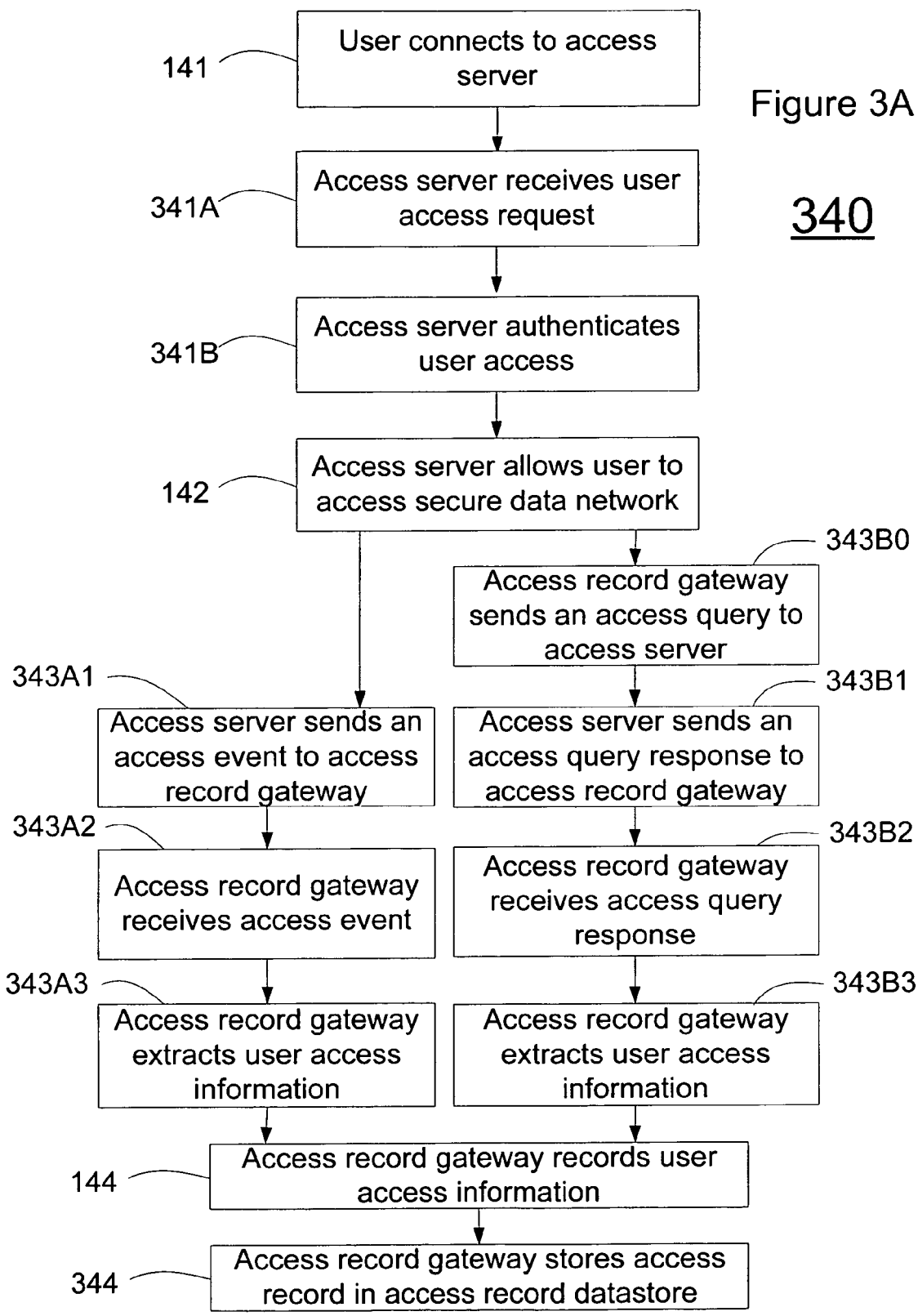

US 7,552,126 B2

ACCESS RECORD GATEWAY

FIELD OF INVENTION

This invention relates generally to data networking, more specifically, to a system and method to process access records with time information.

BACKGROUND

Network security is an important topic in a corporate information structure. There are numerous instances of security breaches discovered continually in many corporate networks. The instances happen daily and almost on an hourly basis. To cope with the security problem, corporate information technology divisions often deploy many security applications to monitor and detect security breaches. Security applications include firewalls, virus scanning applications, intrusion detection systems, intrusion prevention systems, adware detection software, spyware detection software, and many others.

Typically security applications examine network traffic, identifying potential security breaches or certain malicious behavior. When a security breach situation is suspected, a security application typically investigates the source of the traffic. For example, email virus detection software may suspect that an email contains a virus. The virus detection software wants to know which user sent the email. If the user is identified and his computer is still accessing the network, the virus detection software issues a command to shutdown the user's computer to prevent the virus from further propagating and causing further security breaches to the network. If the user is no longer accessing the network, the virus detection software wants to know when the user was on the network and determines the approximate time when the user's computer was contaminated with the virus. The virus detection software needs to know the history of user access.

In another example, an intrusion detection system detects an intrusion coming from an IP address. The intrusion detection system wants to know which user devices were associated with the IP address and when.

In a different example, a document security gateway detects a highly confidentially document is being transferred to a departmental network without proper permission. Further, the document security gateway identifies that the transfer was completed an hour ago. The document security gateway wants to know which user devices from the departmental network were accessing the network at the time of the transfer.

The above discussion identifies a need for a security application to know when a user accesses a secure data network.

SUMMARY

Systems and methods of managing access records of user access to a secure data network may include an access record gateway and an access record datastore. The access record gateway may be in communication with an access server of the secure data network, whereas the access record datastore may be in communication with the access record gateway. The access record gateway may acquire user access information, such as time information; record the user access information in at least one access record; and store the access record in the access record datastore. The access record gateway also may acquire user access activity information and update previously recorded user access information with the user access activity information. The access record may include a plurality of sub-records, selected from a list including, for instance, a user information sub-record, a network information sub-record, and a time information sub-record. The system may include a security application in communication with the access record gateway to query for an access record satisfying, for example, the security query parameter(s).

The access record gateway may process access records of a user accessing a secure data network. User access of a secure data network may include a user accessing a secure data network through the access server, the access server allowing the user to access the secure data network, and the access server providing user access information to an access record gateway. The access record gateway may record the user access information. The access server may identify user access activity, such as a termination of user access to the secure data network, and provide user access activity information to the access record gateway. The access record gateway may update previously recorded user access information with the user access activity information.

Other embodiments of the system and method may include a user information server in communication with the access record gateway. An access record may include a user information sub-record, a network information sub-record, and a time information sub-record. Moreover, the access record may include additional user information, such as user contact information, location information, or departmental information. A data populating process may populate the additional data in the access record.

The data populating process may include the access record gateway recording an access record, the access record gateway sending a user information request to the user information server, the user information server retrieving additional user information, the user information server providing the additional user information to access record gateway; and the access record gateway recording the additional user information into the access record.

Further embodiments of the system and method may include a recording process to record an access record that may include the user accessing the secure data network through the access server, the access server receiving a user access request related to the user, the access server validating user, the access server allowing the user to access the secure data network, the access record gateway acquiring the user access information, the access record gateway recording the user access information and time information into the corresponding sub-records of the access record, and the access record gateway storing the access record in an access record datastore. Acquiring the user access information may include: either the access server sending an access event to the access record gateway, the access record gateway receiving the access event, and the access record gateway extracting the user information from the event; or the access record gateway sending an access query to the access server, the access server sending the user access information to the access record gateway in an access query response, the access record gateway receiving the access query response, and the access record gateway extracting the user access information from the access query response.

Additional embodiments of the system and method may include updating access records, modified in view of subsequent user access activity, such as termination of user access. An updating process may include the access record gateway acquiring the user access activity information, the access record gateway retrieving a key from the user access activity information, the access record gateway retrieving from access record datastore a previously recorded access record matching the key, modifying the access record based on the user access activity information, and storing the modified access record in access record datastore.

Acquiring the user access activity information may include either the access server providing the user access activity information to the access record gateway, or the access record gateway querying the access server for the user activity information. Providing the user access activity information to the access record gateway may include the access server identifying the activity of user access to secure data network, the access server sending an activity event to access record gateway, the access record gateway receiving the activity event, and the access record gateway extracting the user access activity information from the activity event. Querying the access server for the user access activity information may include the access record gateway sending a activity query to the access server, the access server sending the user access activity information to the access record gateway in a activity query response, the access record gateway receiving the activity query response, and the access record gateway extracting the user access activity information from the activity query response.

Various embodiments of the system and method may include a security application in communication with the access record gateway. A security querying process may include the security application sending a security query to access record gateway; the access record gateway attempting to locate and retrieve an access record satisfying the security query, such as by matching a query key against the access record datastore and retrieving any access record whose user information matches the query key; and the access record gateway responding to security application with the retrieved access record(s).

Other various embodiments of the system and method may include an access record archive datastore in communication with an access record archiving security application in communication with the access record gateway. An archiving process may include the access record archiving security application sending a security query to access record gateway according to a security policy, the access record gateway attempting to locate and retrieve any access record(s) that may satisfy the security query, the access record gateway responding to the access record archiving security application with any access record(s) that may satisfy the security query, the access record archiving security application receiving the access record(s), and the access record archiving security application storing them in the access record archive datastore.

The access record gateway may remove access records from the access record datastore in accordance with, for instance, security policies or archiving policies, such as part of the archiving process.

Other aspects, features, advantages, etc. will become apparent to one skilled in the art when the description of the invention herein is taken in conjunction with the accompanying drawings.

BRIEF DESCRIPTION OF DRAWINGS

In the following figures, like references correspond to like components. For the purposes of illustrating the various aspects of the invention, there are shown in the drawings simplified forms, it being understood, however, that the invention is not limited to the precise arrangements shown, but rather only by the claims.

FIG. 2 illustrates a simplified block diagram of an access record according to an embodiment of the present invention.

FIG. 3A illustrates an exemplary recording process to record an access record.

DETAILED DESCRIPTION

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
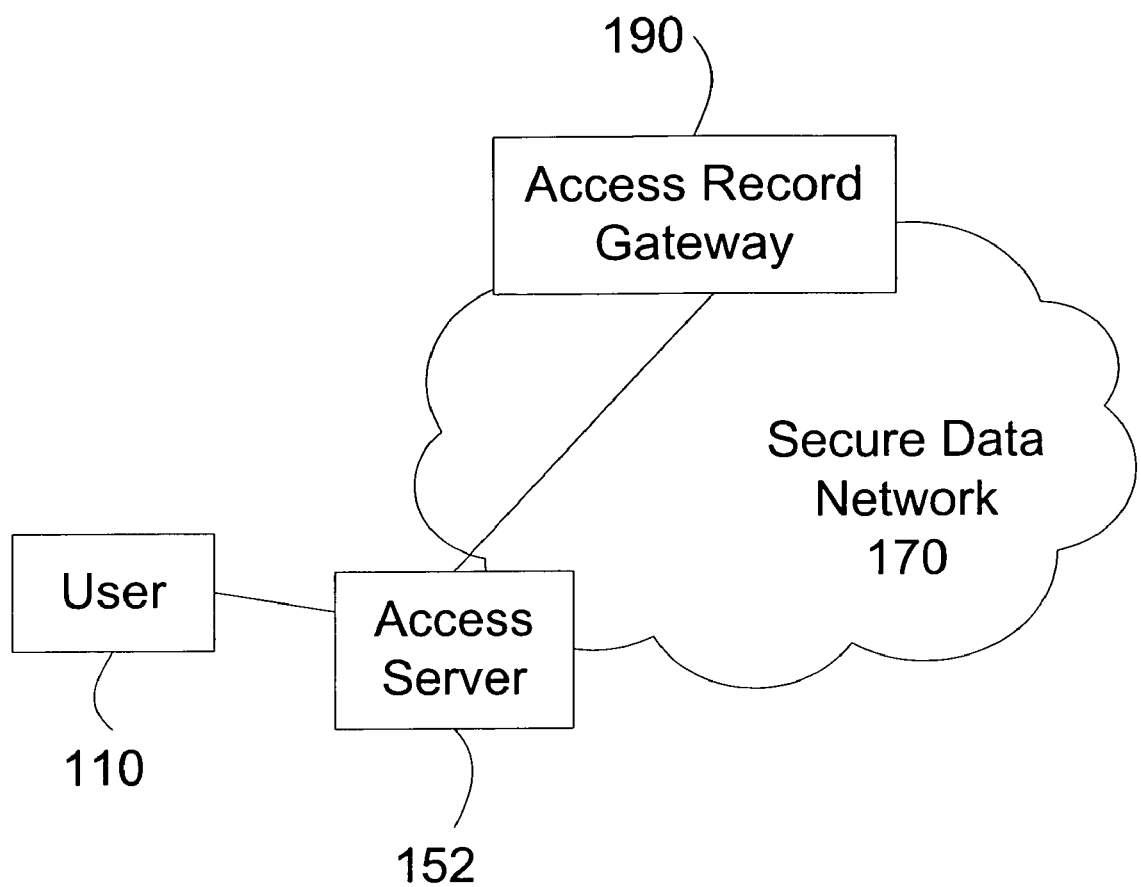
FIG. 1 illustrates a simplified block diagram of a secure data network.
Figure 1A:
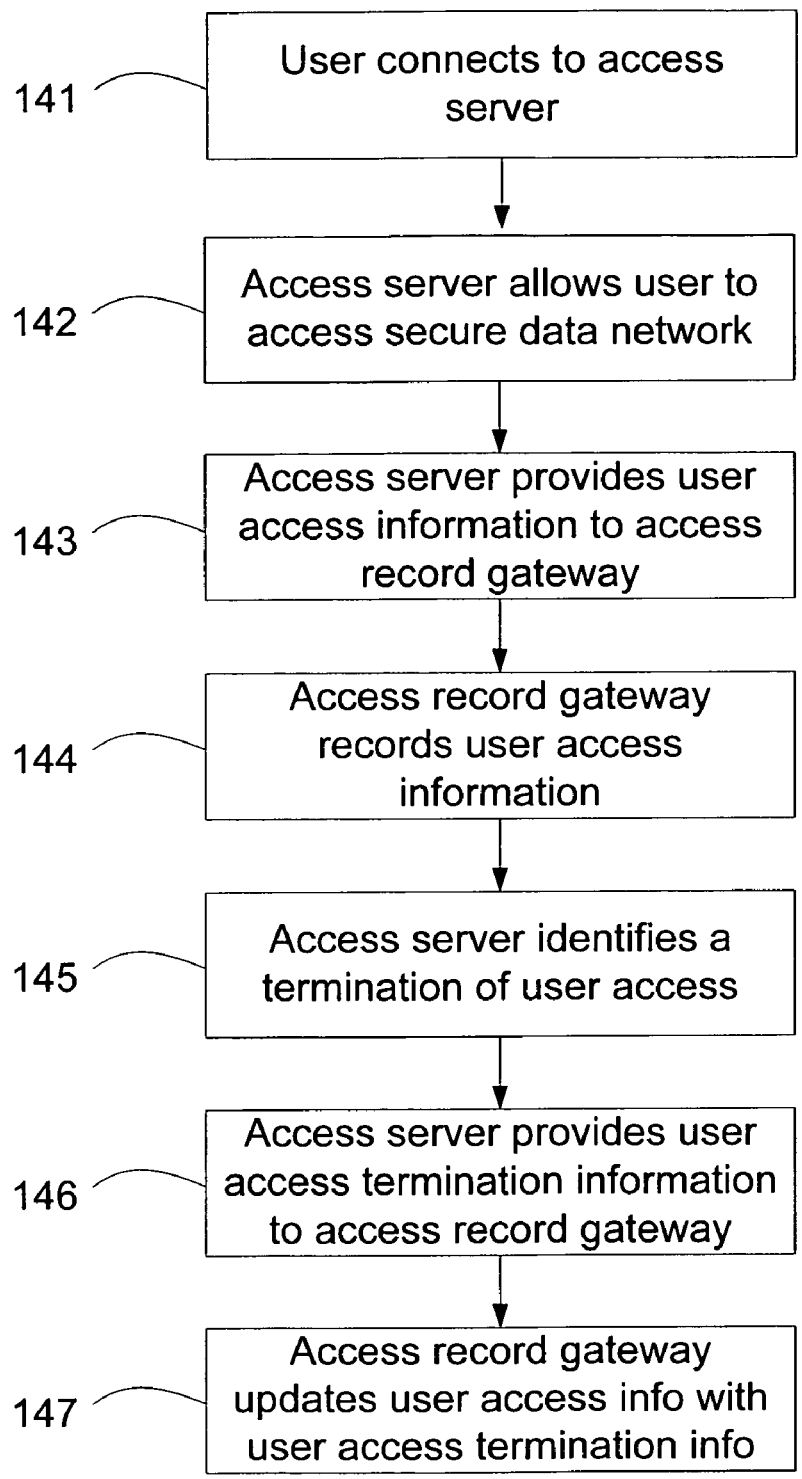
FIG. 1A illustrates an exemplary method of processing access records of a user accessing a secure data network.

FIG. 1 illustrates a simplified block diagram of a secure data network 170. FIG. 1A illustrates an exemplary method of processing access records of a user 110 accessing a secure data network 170. A user 110 may access an access server 152 to connect to a secure data network 170 communicating with an access record gateway 190. Steps of a connecting process 140 may include actions indicated hereafter in parentheses. User 10 may access (141) a secure data network 170 through access server 152. Access server 152 may allow (142) user 110 to access secure data network 170, whereupon access server 152 may provide (143) user access information to access record gateway 190. Access record gateway 190 may record (144) the user access information. Access server 152 may determine (145) later that user activity has occurred or will occur, such as the access of user 110 to secure data network 170 has or will be terminated, whereupon access server 152 may provide (146) the user access activity information, such as user access termination information, to access record gateway 190. Access record gateway 190 may update (147) previously recorded user access information with the user access activity information.

Examples of a secure data network 170 may include: a data network based on an Internet Protocol (IP); a wired Local Area Network (LAN) such as an Ethernet; a Wireless Local Area Network (WLAN); a Wide Area Network (WAN); a public data network, such as the Internet, a WiFi hotspot network or a General Packet Radio Service (GPRS) network; and a private data network such as a home network, a company network, or a corporate Virtual Private Network (VPN).

Examples of user devices by which the user 110 may access the network 170 may include: a desktop personal computer; a laptop personal computer; a personal data assistant (PDA); a cellular phone; a smart-phone; and any computing device capable of accessing secure data network 170.

Examples of the access server 152 may include: a network access point such as a firewall; a wireless local area network (WLAN) access point; a virtual private network (VPN) gateway or server; a remote access server (RAS) or a broadband remote access server (BRAS); a web server or a secure web server. In one embodiment, access server 152 may include authentication functionality such as a remote authentication dial in user service (RADIUS) server, a RADIUS proxy server, a DIAMETER server, or an ASP.NET Passport server. In one embodiment, access server 152 may include application level authentication functionality, such as a simple mail transport protocol (SMTP) server, or a post office protocol version 3 (POP3) server. In one embodiment, access server 152 may include functionality to provide a network address to a user device, such as a dynamic host configuration protocol (DHCP) server.

Figure 2A:
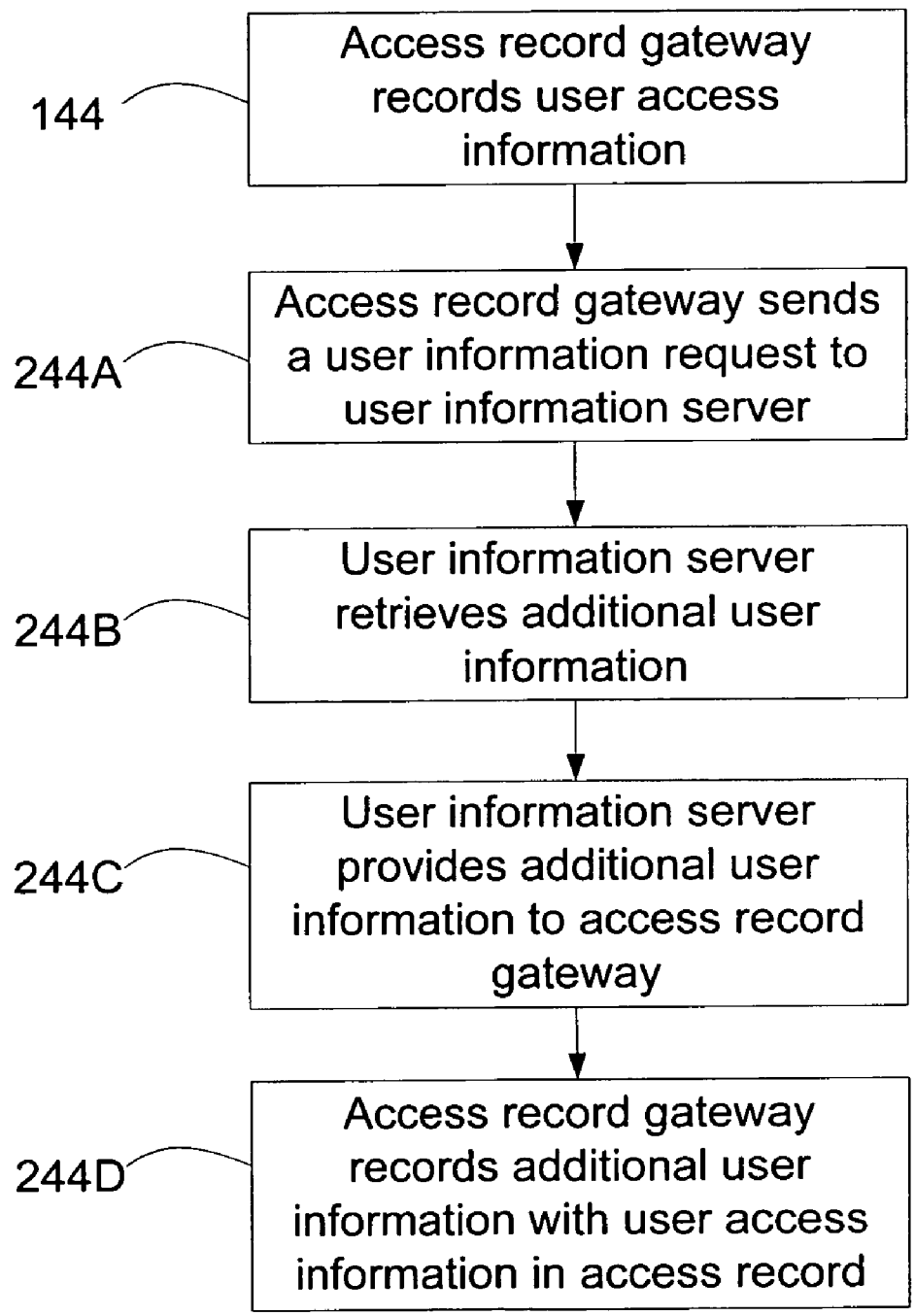
FIG. 2A illustrates an exemplary data populating process to populate additional data in an access record.

FIG. 2 illustrates a simplified block diagram of an access record 220 according to an embodiment of the present invention. FIG. 2A illustrates an exemplary data populating process 240 to populate additional data in an access record 220 via a user information server 230. Steps of a data populating process 240 may include actions indicated hereafter in parentheses.

An access record 220 may include a user information sub-record 223, a network information sub-record 225, and a time information sub-record 227. Moreover, an access record 220 may include additional user information 229, such as user contact information, location information, or departmental information.

Data populating process 240 may provide additional user information from user information server 230 to access record gateway 190. When access record gateway 190 records (144) an access record 220, access record gateway 190 may send (244A) a user information request to the user information server 230. The user information request may include a user identity. The user information server may retrieve (244B) additional user information based on the user identity and provide (244C) the additional user information to access record gateway 190. Access record gateway 190 may record (244D) the additional user information into the access record 220.

The additional user information might include the following examples. The contact information might include a desk phone number, a mobile phone number, an email address, and/or an instant messaging user name. The location information might include a cubicle number, an office number, a building name, and/or a city name. The departmental information might include a department name, a subsidiary name, and/or an area of responsibilities.

User information sub-record 223 may include information about a user at the time when the user 110 accesses a secure data network 170. User information may include a user identity, such as a user name, a network domain name, an employee number, a device name, a device serial number, and/or a host name.

Network information sub-record 225 may include information about a secure data network 170 at the time a user 110 is accessing the secure data network 170. Network information may include, for example, a plurality of network addresses of the user device accessing the secure data network, or information about an access server handling the user access to the secure data network. In one embodiment, network information may include an identity of an authentication server.

Time information sub-record 227 may include information about the time user 110 accesses a secure data network 170. Time information may include a start time of the user access and/or an end time of the user access.

Figure 3:
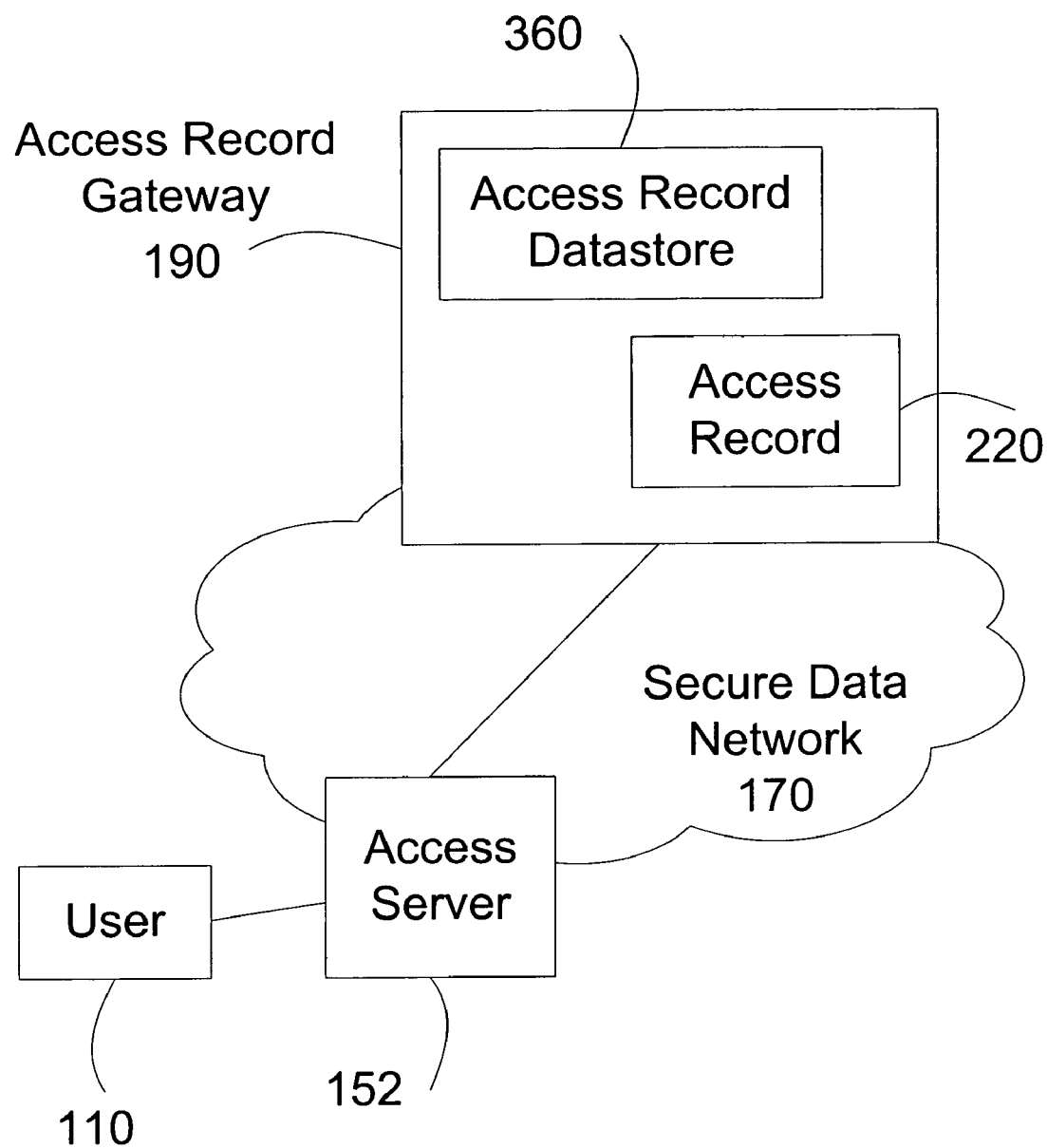
FIG. 3 illustrates a simplified block diagram of an access record gateway in a secure data network, according to an embodiment of the present invention.

FIG. 3 illustrates a simplified block diagram of an access record gateway 190 in a secure data network 170, according to an embodiment of the present invention. FIG. 3A illustrates an exemplary recording process to record an access record 220. Steps of a recording process 340 may include actions indicated hereafter in parentheses. As shown in FIG. 1A, user 110 may access (141) secure data network 170 through access server 152. In one embodiment, access server 152 receives (341A) a user access request related to user 110. Access server 152 may validate (341B) user 110 in order to allow user 110 to access secure data network 170. Access server 152 may allow (142) user 110 to access secure data network 170.

In a data-push scenario, access server 152 may send (343A1) an access event to access record gateway 190 after access server 152 allows user 110 to access secure data network 170. In one embodiment, the access event may include the user access information. Access record gateway 190 may receive (343A2) the access event and extract (343A3) the user information from the event.

In a data-pull scenario, access record gateway 190 also may obtain information about the user access via an access query to access server 152. Access record gateway 190 may send (343B0) an access query to access server 152. Access server 152 may send (343B1) the user access information to access record gateway 190 in an access query response to this access query. Access record gateway 190 may receive (343B2) the access query response and extract (343B3) the user access information from the access query response.

Access record gateway 190 may record (144) the user access information and time information into the corresponding sub-records of the access record 220. Access record gateway 190 may include an access record datastore 360, in which access record gateway 190 may store (344) access record 220.

The user access request may include, for instance, the user identity. In one scenario, the user access request may include network information such as a user device network address. In another scenario, access server 152 may provide a user device a network address. In one scenario, the user access request may include a start time of the user access.

In one embodiment, the user access request uses DHCP protocol. The DHCP user access request may include a user name and a user device media access control (MAC) address. Access server 152 may provide to user device an IP address. In one embodiment, the user access request may use a RADIUS protocol. The RADIUS request may include a user name and a user device IP address.

In one embodiment, the user access request may use DIAMETER protocol, SMTP protocol or POP3 protocol, hypertext transfer protocol (HTTP), extensible authentication protocol (EAP), or a proprietary protocol.

User access information may include a user name and a plurality of user device network addresses, which include user device IP address. In one embodiment, user access information may include an access server network address. In one embodiment, user access information may include a start time of the user access. In one embodiment, the start time of the user access may be the time when access server 152 receives the user access request.

Examples of the access event may include: an alarm such as a simple network management protocol (SNMP) trap; an event log message; or a message based on an application programming interface (API), such as a java remote method invocation (RMI). In one embodiment, access server 152 may send the access event immediately after receiving the user access request, in a batch, or after a period of time. For example, access server 152 may send the access event 2 seconds, 10 seconds, or 1 minute after receiving the user access request.

Examples of the access query may include: an SNMP GET request; an SNMP GETBULK request; an HTTP GET request; or a file encoded as an extensible markup language (XML) document based on a document type definition (DTD). In one embodiment, access record gateway 190 may send the access query periodically, such as every 10 minutes, every 2 minutes or every 12 minutes. In another embodiment, access record gateway 190 may send the access query at a random time.

The extracted user access information may include user information and network information. In one embodiment, the user access information may include time information. In another embodiment, access record gateway 190 may determine a time when the user access information is received. The time may be used for the start time of the user access.

Examples of the access record datastore 360 may include: a hard disk, a memory, or a flash memory, and/or a database.

Figure 4:
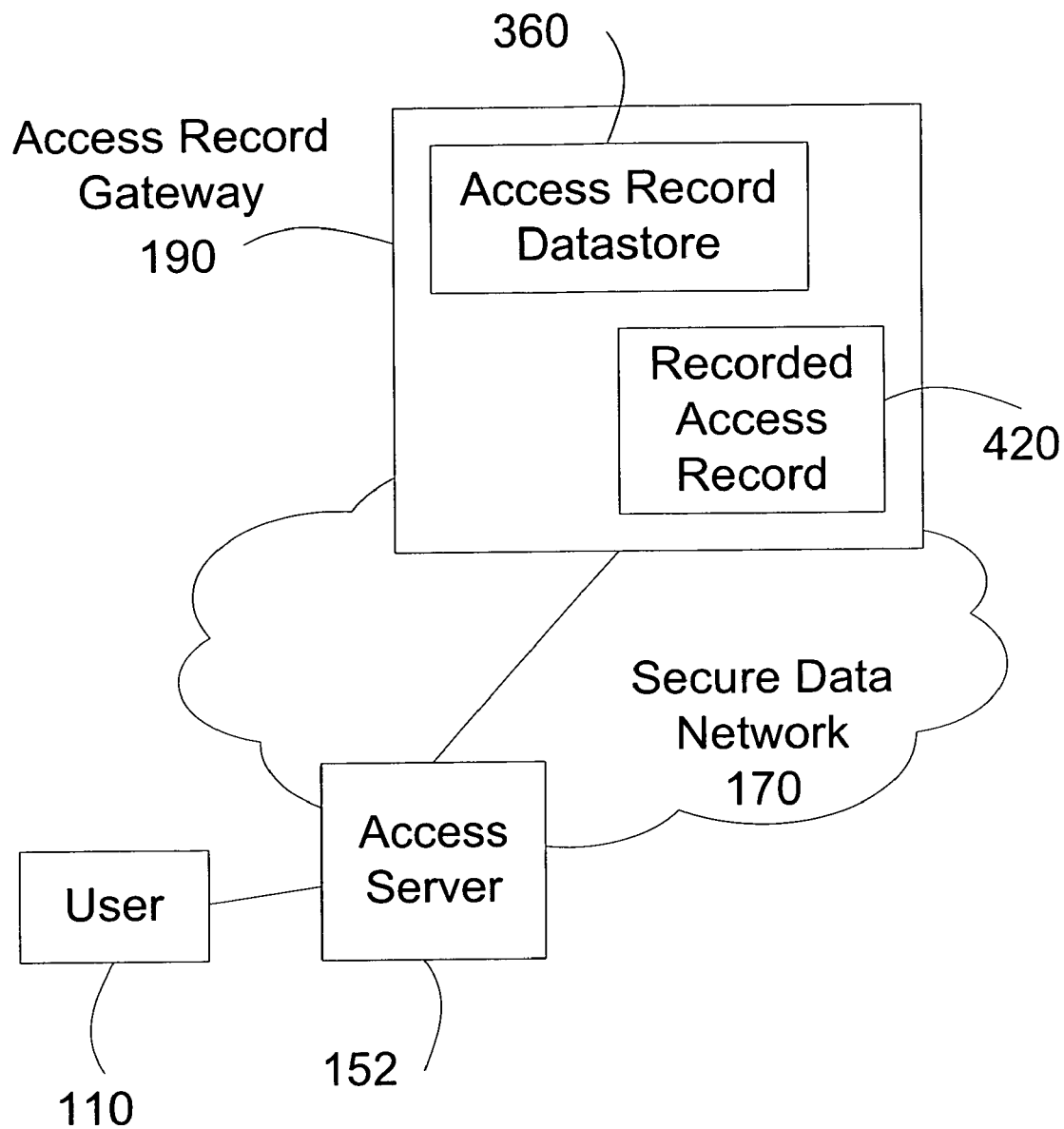
FIG. 4 illustrates a simplified block diagram of an access record gateway in a secure data network, according to an embodiment of the present invention.
Figure 4A:
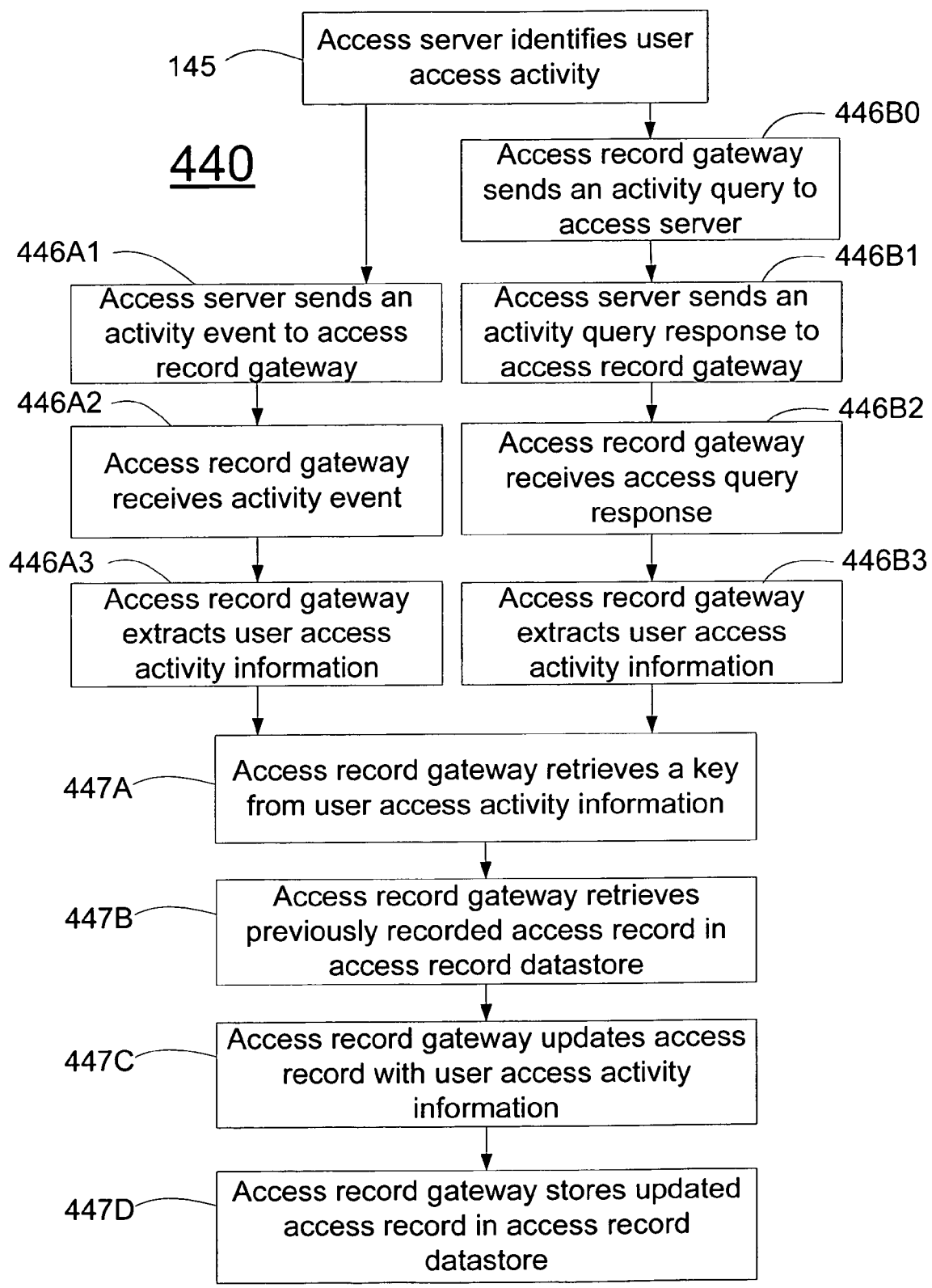
FIG. 4A illustrates an exemplary updating process to update an access record.

FIG. 4 illustrates a simplified block diagram of an access record gateway 190 in a secure data network 170, according to an embodiment of the present invention. FIG. 4A illustrates an exemplary updating process to update an access record 220. Steps of an updating process 440 may include actions indicated hereafter in parentheses. As shown in FIG. 1A, access server 152 may determine (145) that user 110 no longer is accessing secure data network 170.

In a data-push scenario, access server 152 may provide user access activity information to access record gateway 190, such as by sending (446A1) an activity event to access record gateway 190. Such an activity event may occur after identifying (145) the termination of user access to secure data network 170. The activity event, here a termination event, may include the user access activity information, i.e., the user access termination information. Access record gateway 190 may receive (446A2) the termination event and extract (446A3) the user access activity information from the termination event.

In a data-pull scenario, access record gateway 190 may send (446B0) an activity query to access server 152, such as a termination query. Access server 152 may send (446B1) the user access activity information to access record gateway 190 in an activity query response to the activity query. Access record gateway 190 may receive (446B2) the activity query response and extract (446B3) the user access activity information from the activity query response, which in this case corresponds to user access termination information.

Access record gateway 190 then may retrieve (447A) a key from the user access activity information. The retrieved key may be a user name or a user device network address and may include an access server network address. Access record gateway 190 may retrieve (447B) a previously recorded access record 420 matching the key. In one embodiment, access record gateway 190 may retrieve (447B) the previously recorded access record 420 from access record datastore 360, modify (447C) access record 420 based on the user access activity information, and store (447D) the modified access record 420 in access record datastore 360

In one example involving user access termination information, access server 152 may not detect any network traffic from user 110 for a duration of time. In one example, the time duration may be 20 minutes, 2 hours, or 2 minutes. In one example, access server 152 may monitor network packets, and determine that the network packets do not include user device network address of user 110.

In another embodiment, access server 152 may determine that user 110 is no longer allowed to access secure data network 170. For instance, user 110 may violate a security policy, or one or more resources allowed for user 110 to access secure data network 170 may have been exhausted. The resources might include one or more of usage time, usage data bandwidth or usage data volume. In one embodiment, the resources include specific network resources, or corporate resources.

In further embodiment, access server 152 may receive a user access termination request related to user 110.

Examples of the activity event, such as a termination event may include: an alarm such as a small network management protocol (SNMP) trap; an event log message; or a message based on an application programming interface (API), such as a java remote method invocation (RMI). In one embodiment, after determining that user 110 no longer accesses secure data network 170, access server 152 may send the termination event immediately, in a batch, or after a period of time, such as 3 seconds, 15 seconds, or 1 minute.

Examples of the activity query, such as a termination query may include: an SNMP GET request or an SNMP GETBULK request; an HTTP GET request; or a file encoded as an extensible markup language (XML) document based on a document type definition (DTD). In one embodiment, access record gateway 190 may send the termination query periodically, such as every 12 minutes, every 2 minutes or every 13 minutes. In another embodiment, access record gateway 190 may send the termination query at random times.

In one embodiment, user access activity information may include a user device network address, such as a network address of access server 152, and a time indicating the termination time of user access. In one embodiment, access record gateway 190 may determine a time when user access activity information is received and use the time as the end time of the user access. Access record gateway 190 may store the termination time as the end time of access record 420.

Figure 5:
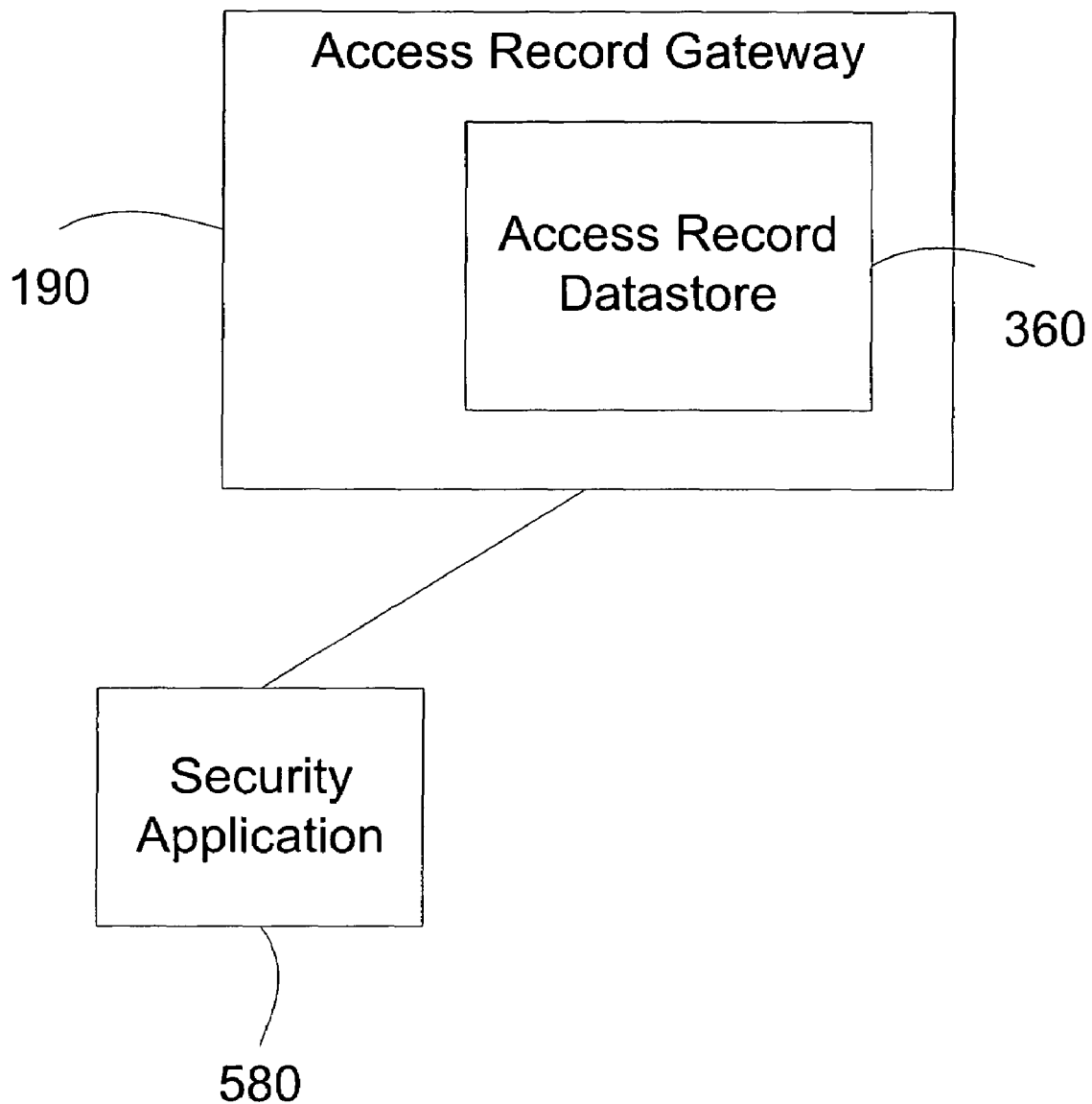
FIG. 5 illustrates a simplified block diagram of an access record gateway and a security application, according to an embodiment of the present invention.
Figure 5A:
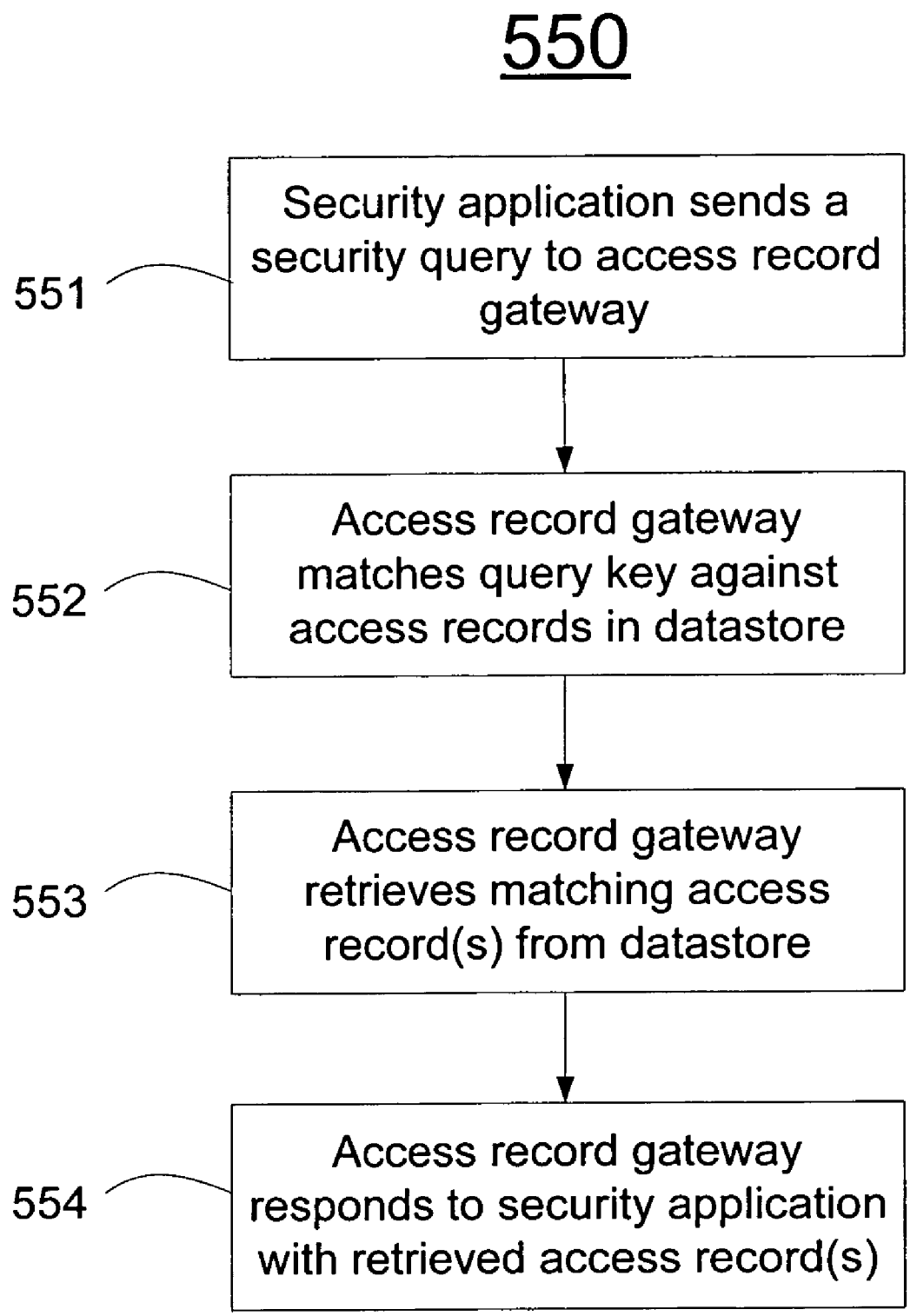
FIG. 5A illustrates an exemplary security querying process by an access record gateway.

FIG. 5 illustrates a simplified block diagram of an access record gateway 190 and a security application 580, according to an embodiment of the present invention. FIG. 5A illustrates an exemplary security querying process by an access record gateway 190. Steps of a security querying process 550 may include actions indicated hereafter in parentheses.

Access record gateway 190 may include access record datastore 360. A security application 580 may send (551) a security query to access record gateway 190. A security query may relate to access information of a user. A security query may provide, for example, a query key, such as a user name, a user device network address, a time, or an access server network address. The security query need not have a query key, but may provide query parameters that otherwise define and delimit the scope of the security query. Processing the security query may entail, in general, searching the access records for those that satisfy the query parameters. Access record gateway 190 may process the security query, for instance, by attempting to match (552) the query key against the access record datastore 360 and retrieve (553) an access record 420 whose user information matches the query key. Access record gateway 190 responds (554) to security application 580 with the retrieved access record 420. In one embodiment, access record gateway 190 may retrieve a plurality of access records that match the query key and respond to security application 580 with the retrieved plurality of access records 420.

In one embodiment, a query key may include a time. Access record gateway 190 may match the time against the access record datastore 360 and retrieves an access record 420 whose time information overlaps with the time. In one embodiment, if the time is between the start time and the end time of the time information, the time information overlaps with the time. In one embodiment, if time information does not have an end time and the time is after the start time, the time information overlaps with the time.

In one embodiment, a query key may include a combination of user name, user device network address, access server network address and time. Access record gateway 190 may match the combination of query data against the access record datastore 360 and retrieve a matching access record 420.

In another embodiment, a query key may include a range of user names, a range of user device network addresses, a range of server network addresses, wildcard characters, and/or a regular expression.

Examples of a security query sent to an access record gateway 190 by an access server 152 may be based: on a database query interface, such as structured query language (SQL), java database connectivity (JDBC) or open database connectivity (ODBC) interface; on a web technology, such as HTTP, Weblogic technology, or ASP.NET; on an application programming interface (API) such as remote method invocation (RMI) or common object request broker architecture (CORBA); on an extensible markup language (XML) document based on a document type definition (DTD); and/or on a common line interface (CLI).

Figure 6:
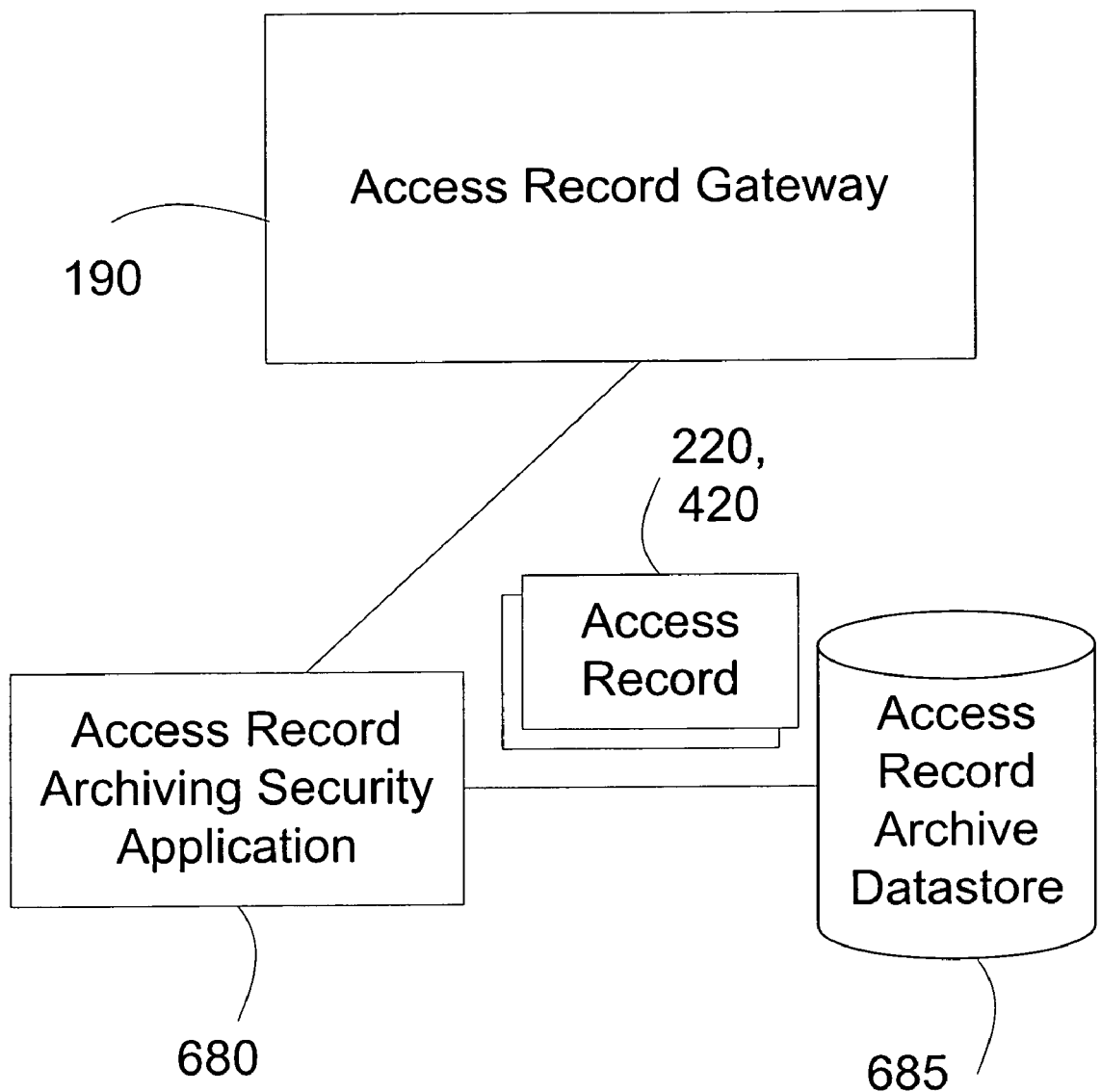
FIG. 6 illustrates a simplified block diagram of an access record gateway, an access record archiving security application, and an access record archive datastore, according to an embodiment of the present invention.
Figure 6A:
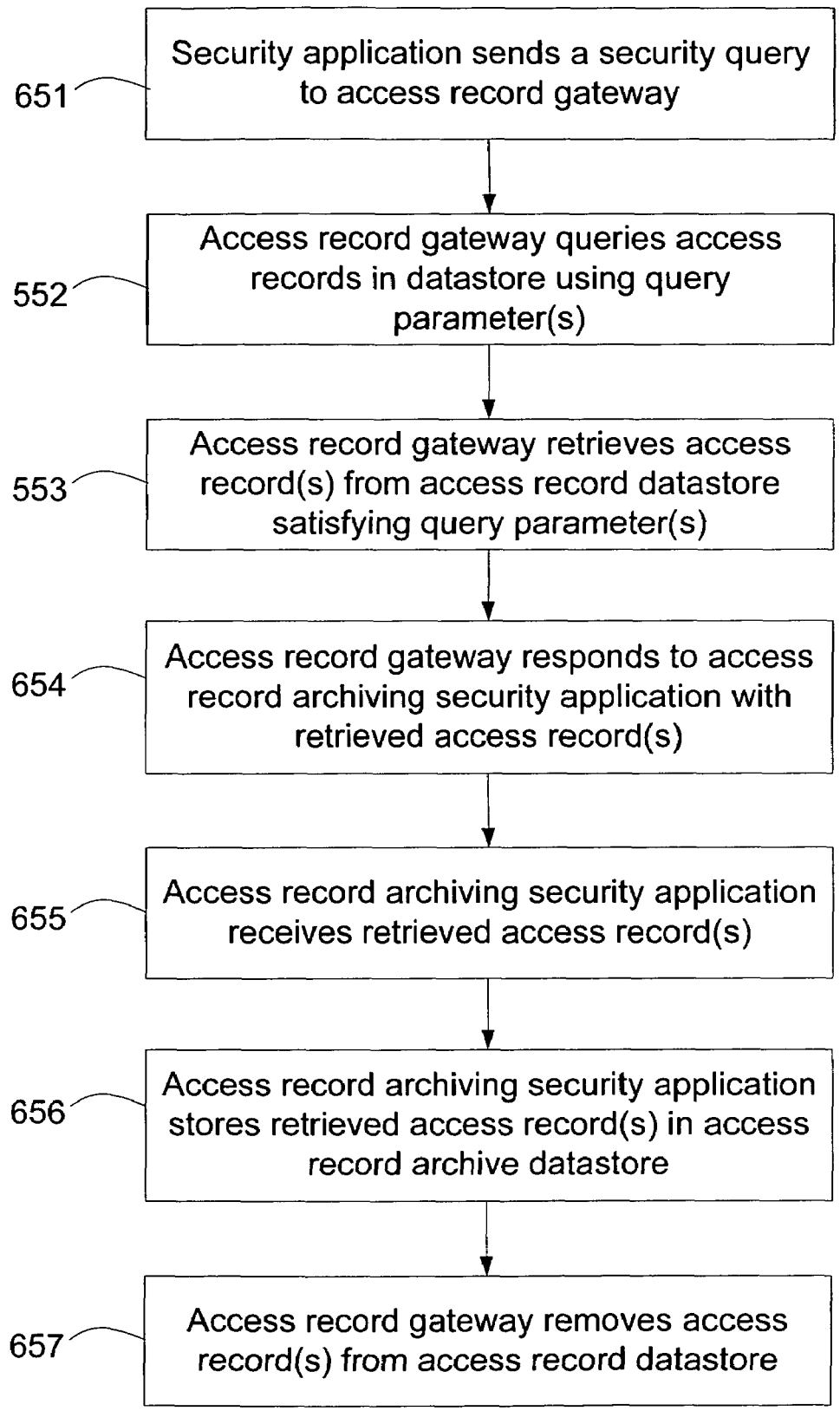
FIG. 6A illustrates an exemplary archiving process of archiving access records according to security policies.

FIG. 6 illustrates a simplified block diagram of an access record gateway 190, an access record archiving security application 680, and an access record archive datastore 685, according to an embodiment of the present invention. FIG. 6A illustrates an exemplary archiving process of archiving access records 220, 420 according to security policies. Steps of an archiving process 650 may include actions indicated hereafter in parentheses.

Access record archiving security application 680 may send (651) a security query to access record gateway 190 according to a security policy. Access record gateway 190 may match (552) and retrieve (553) access records 220, 420 that match a security key in the security query. Access record gateway 190 may respond (654) to access record archiving security application 680 with a plurality of access records 220, 420 that match the security key in the security query. Access record archiving security application 680 may receive (655) and store (656) the plurality of access records 420, such as in an access record archive datastore 685 connected to access record archiving security application 680. Access record gateway 190 may act to remove (657) access records 220, 420 from access record datastore 360 in accordance with, for instance, security policies or archiving policies.

Access record archive datastore 685 may include, for instance, a hard disk, a flash memory, a database, a network access storage, and/or a storage area network (SAN).

An access record archiving security application 680 may archive access records 220, 420 in accordance with various security policies. The security policies may relate, for example, to corporate security policies, or to governmental regulations, such as the Sarbanes-Oxley Act (SOX) or the Health Insurance Portability and Accountability Act (HIPAA).

In one example, a security policy may require archiving of access information related to a user. Access record archiving security application 680 may sends to access record gateway 190 a security query that includes the user name in the query key.

In another example, a security policy may require archiving of access information related to a user device. Access record archiving security application 680 may send to access record gateway 190 a security query that includes the user device MAC address.

In further example, a security policy may require archiving of access information for a time period, such as 5 pm to 7 pm, 10 am to 11:30 am, or during the half hour before closing time for the New York Stock Exchange. Access record archiving security application 680 may send to access record gateway 190 a security query that includes the time period.

In yet another embodiment, a security policy may require archiving access information related to an authentication server for a time period. Access record archiving security application 680 may send to access record gateway 190 a security query that includes the authentication server identity and the time period.

In an additional embodiment, access record archiving security application 680 may archive access records at a scheduled time according to a security policy, such as every 30 minutes, every working day after 6 pm, or every hour at the half hour mark.

Removal of access records 220, 420 may be based, for instance, on time, such as access records 220, 420 with a start time older than a year. In another example, access records 220, 420 with an end time older than three months may be removed. In addition, access records 220, 420 may be removed based on user information. For example, access records 220, 420 with users in a specific department or location are removed. In a different embodiment, access records may be removed based on network information, such as those with a network address of a particular subnet. In one embodiment, access records with a MAC address that matches a range of MAC addresses may be removed. In yet another embodiment, access records may be removed based on a combination of user information, network information and/or time information.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method of managing access records of user access to a secure data network, the method comprising:

acquiring user access information at an access record gateway from an access server, wherein the access server allows at least one user to access the secure data network;

recording the user access information in at least one access record;

storing the at least one access record in an access record data store, wherein the access record gateway includes the access record datastore;
acquiring user access activity information; and
updating previously recorded user access information with the user access activity information comprising the steps of:
retrieving a key from the user access activity information;
retrieving a previously recorded access record matching the key;
modifying the previously recorded access record based on the user access activity information; and,
storing the modified access record;
wherein the user access information includes time information; and,
wherein the at least one access record includes a plurality of sub-records, the plurality of sub-records being selected from a list of sub-records comprising a user information sub-record, a network information sub-record, and a time information sub-record.

2. The method of claim 1 further comprising:
identifying a termination of user access to the secure data network.

3. The method of claim 2 wherein identifying a termination of user access to the secure data network comprises receiving a user access termination request relating to the user.

4. The method of claim 2 wherein identifying a termination of user access to the secure data network comprises detecting an absence of network traffic for the user over a specified period of time.

5. The method of claim 2 wherein identifying a termination of user access to the secure data network comprises determining that the user lacks authorization to continue accessing the secure data network.

6. The method of claim 1 wherein:
the list of sub-records further comprises at least one additional user information sub-record.

7. The method of claim 6 wherein:
the at least one additional user information sub-record comprises user contact information, location information, or departmental information.

8. The method of claim 6 further comprising:
populating the at least one additional user information sub-record.

9. The method of claim 8 wherein populating the at least one additional user information sub-record comprises:
sending a user information request to a user information server;
retrieving additional user information;
providing the additional user information to access record gateway; and
recording the additional user information into the at least one access record.

10. The method of claim 1 wherein acquiring the user access information comprises:
receiving an access event at the access record gateway; and,
extracting the user access information from the access event.

11. The method of claim 1 wherein acquiring the user access information comprises:
sending an access query to an access server;
receiving an access query response; and,
extracting the user access information from the access query response.

12. The method of claim 1 wherein acquiring the user access activity information comprises:
receiving an activity event at the access record gateway; and,
extracting the user access activity information from the activity event.

13. The method of claim 1 wherein acquiring the user access activity information comprises:
sending an activity query to an access server;
receiving an activity query response; and,
extracting the user access activity information from the activity query response.

14. The method of claim 1 further comprising:
receiving at the access record gateway a security query;
processing the security query against the at least one access record;
retrieving each at least one access record satisfying the security query; and,
responding to the security query with each retrieved at least one access record.

15. The method of claim 14 wherein:
the security query includes at least one query parameter delimiting the security query's scope.

16. The method of claim 15 wherein:
the at least one query parameter includes a query key comprising a user name, a user device network address, a time, or an access server network address.

17. The method of claim 14 wherein:
a security application in communication with the access record gateway sends the security query and receives the response to the security query.

18. The method of claim 17 further comprising:
receiving the retrieved at least one access record; and,
storing the retrieved at least one access record in an access record archive datastore;
wherein the security application comprises an access record archiving security application.

19. The method of claim 18 further comprising:
removing the at least one access record from the access record datastore in accordance with a security policy or an archiving policy.

20. The method of claim 1 further comprising:
receiving a user access request related to the user;
validating user for access; and
allowing the user to access the secure data network.

21. The method of claim 1, wherein the time information includes at least one of:
information about the time the at least one user accesses the secure data network; a start time of the user access; and an end time of the user access.

22. A system of managing access records of user access to a secure data network, the system comprising:
an access record gateway in communication with an access server of the secure data network, wherein the access server allows at least one user to access the secure data network, and the access record gateway receives an at least one access record from the access server; and,
an access record datastore including a computer readable medium in communication with the access record gateway for storing the at least one access record on the computer-readable medium of the access record datastore;
wherein the at least one access record comprises user access information including time information; and,
wherein the at least one access record includes a plurality of sub-records, the plurality of sub-records being selected from a list of sub-records comprising a user information sub-record, a network information sub-record, and a time information sub-record, and wherein the access record gateway is configured to update previously recorded user access information with user access activity information by:

retrieving a key from the user access activity information;

retrieving a previously recorded access record matching the key;

modifying the previously recorded access record based on the user access activity information; and, storing the modified access record.

23. The system of claim 22 further comprising:

a security application in communication with the access record gateway.

24. The system of claim 23 wherein:

the access record gateway is configured to:

receive a security query;

process the security query against the at least one access record;

retrieve each at least one access record satisfying the security query; and, respond to the security query with each retrieved at least one access record.

25. The system of claim 24 wherein:

the security query includes at least one query parameter delimiting the security query's scope.

26. The system of claim 25 wherein:

the at least one query parameter includes a query key comprising a user name, a user device network address, a time, or an access server network address.

27. The system of claim 24 wherein the security application comprises an access record archiving security application and wherein:

the access record archiving security application is configured to:

receive the retrieved at least one access record; and, store the retrieved at least one access record in an access record archive datastore.

28. The system of claim 22 further comprising:

an access record archiving security application in communication with the access record gateway; and, an access record archive datastore in communication with the access record archiving security application.

29. The system of claim 22 wherein:

the list of sub-records further comprises at least one additional user information sub-record.

30. The system of claim 29 wherein:

the at least one additional user information sub-record comprises user contact information, location information, or departmental information.

31. The system of claim 29 further comprising:

a user information server in communication with the access record gateway for retrieving additional user information.

32. The system of claim 22 wherein:

the access record gateway is configured to:

acquire the user access information by receiving an access event and extracting the user access information from the access event; and generate the at least one access record.

33. The system of claim 22 wherein:

the access record gateway is configured to:

acquire the user access information by sending an access query to an access server, receiving an access query response, and extracting the user access information from the access query response; and generate the at least one access record.

34. The system of claim 22 wherein:

the access record gateway is configured to acquire the user access activity information by:

receiving an activity event; and, extracting the user access activity information from the activity event.

35. The system of claim 22 wherein:

the access record gateway is configured to acquire the user access activity information by:

sending an activity query to an access server;

receiving an activity query response; and, extracting the user access activity information from the activity query response.

36. The system of claim 22 wherein:

the access record gateway is further configured to:

remove the at least one access record from the access record datastore in accordance with a security policy or an archiving policy.

37. The system of claim 22, wherein the time information includes at least one of:

information about the time the at least one user accesses the secure data network; a start time of the user access; and an end time of the user access.

38. A method of managing access records of user access to a secure data network, the method comprising:

acquiring user access information at an access record gateway from an access server, wherein the access server allows at least one user to access the secure data network;

recording the user access information in at least one access record;

storing the at least one access record in an access record datastore, wherein the access record gateway includes the access record datastore;

acquiring user access activity information; and updating previously recorded user access information with the user access activity information;

wherein the user access information includes time information, and wherein the at least one access record includes a plurality of sub-records, the plurality of sub-records being selected from a list of sub-records comprising a user information sub-record, a network information sub-record, and a time information sub-record; and further comprising:

receiving at the access record gateway a security query;

processing the security query against the at least one access record;

retrieving each at least one access record satisfying the security query; and, responding to the security query with each retrieved at least one access record.

39. The method of claim 38 further comprising: identifying a termination of user access to the secure data network.

40. The method of claim 39 wherein identifying a termination of user access to the secure data network comprises receiving a user access termination request relating to the user.

41. The method of claim 39 wherein identifying a termination of user access to the secure data network comprises detecting an absence of network traffic for the user over a specified period of time.

42. The method of claim 39 wherein identifying a termination of user access to the secure data network comprises determining that the user lacks authorization to continue accessing the secure data network.

43. The method of claim 38 wherein:
the list of sub-records further comprises at least one additional user information sub-record.

44. The method of claim 43 wherein:
the at least one additional user information sub-record comprises user contact information, location information, or departmental information.

45. The method of claim 43 further comprising:
populating the at least one additional user information sub-record.

46. The method of claim 45 wherein populating the at least one additional user information sub-record comprises:
sending a user information request to a user information server;
retrieving additional user information;
providing the additional user information to access record gateway; and
recording the additional user information into the at least one access record.

47. The method of claim 38 wherein acquiring the user access information comprises:
receiving an access event at the access record gateway; and,
extracting the user access information from the access event.

48. The method of claim 38 wherein acquiring the user access information comprises:
sending an access query to an access server;
receiving an access query response; and,
extracting the user access information from the access query response.

49. The method of claim 38 wherein acquiring the user access activity information comprises:
receiving an activity event at the access record gateway; and,
extracting the user access activity information from the activity event.

50. The method of claim 38 wherein acquiring the user access activity information comprises:
sending an activity query to an access server;
receiving an activity query response; and,
extracting the user access activity information from the activity query response.

51. The method of claim 38 wherein:
the security query includes at least one query parameter delimiting the security query's scope.

52. The method of claim 51 wherein:
the at least one query parameter includes a query key comprising a user name, a user device network address, a time, or an access server network address.

53. The method claim 38 wherein:
a security application in communication with the access record gateway sends the security query and receives the response to the security query.

54. The method of claim 53 further comprising:
receiving the retrieved at least one access record; and,
storing the retrieved at least one access record in an access record archive datastore;
wherein the security application comprises an access record archiving security application.

55. The method of claim 54 further comprising:
removing the at least one access record form the access record datastore in accordance with a security policy or an archiving policy.

56. The method of claim 38 further comprising:
receiving a user access request related to the user;
validating user for access; and
allowing the user to access the secure data network.

* * * * *

UNITED STATES PATENT AND TRADEMARK OFFICE
CERTIFICATE OF CORRECTION

PATENT NO. : 7,552,126 B2  Page 1 of 1
APPLICATION NO. : 11/446028
DATED : June 23, 2009
INVENTOR(S) : Lee Chen, John Chiong and Philip Kwan It is certified that error appears in the above-identified patent and that said Letters Patent is hereby corrected as shown below:

On the title page, item (75)
Inventor's name should be: "Philip Kwan"

Signed and Sealed this
Fourteenth Day of May, 2013

Teresa Stanek Rea
*Acting Director of the United States Patent and Trademark Office*